United States Patent
Bridges

(10) Patent No.: US 7,044,081 B1
(45) Date of Patent: May 16, 2006

(54) BIFURCATED HABITAT FOR ANIMALS

(76) Inventor: Peggy L. Bridges, P.O. Box 582, Homewood, IL (US) 60430

( * ) Notice: Subject to any disclaimer, the term of this patent is extended or adjusted under 35 U.S.C. 154(b) by 0 days.

(21) Appl. No.: 10/999,467

(22) Filed: Dec. 1, 2004

(51) Int. Cl.
 *A01K 63/00* (2006.01)
 *A01K 1/03* (2006.01)
 *A01K 31/06* (2006.01)

(52) U.S. Cl. .................. 119/246; 119/452; 119/472; 47/69

(58) Field of Classification Search ............ 47/69; 119/245–253, 416, 452; D30/101, 104, 106
See application file for complete search history.

(56) References Cited

U.S. PATENT DOCUMENTS

| | | | | |
|---|---|---|---|---|
| 164,074 | A * | 6/1875 | Chase | 119/246 |
| 296,853 | A * | 4/1884 | Ledig | 119/246 |
| 1,838,215 | A * | 12/1931 | De Clairmont | 119/248 |
| 2,346,001 | A * | 4/1944 | Bate | 119/472 |
| 2,693,786 | A * | 11/1954 | Babros et al. | 119/459 |
| 2,776,642 | A * | 1/1957 | Sepersky | 119/263 |
| 3,066,645 | A * | 12/1962 | Mulder | 119/265 |
| 3,288,110 | A * | 11/1966 | Goldman et al. | 119/248 |
| 3,786,781 | A * | 1/1974 | Poulsen | 119/246 |
| 3,841,267 | A * | 10/1974 | Miller | 119/266 |
| 3,857,366 | A * | 12/1974 | Willinger | 119/266 |
| 4,120,265 | A * | 10/1978 | Davis | 119/248 |
| 4,147,131 | A * | 4/1979 | Walker | 119/246 |
| 4,204,499 | A * | 5/1980 | Leyva et al. | 119/246 |
| 4,754,571 | A * | 7/1988 | Riechmann | 47/59 R |
| 4,958,593 | A * | 9/1990 | Hurlburt et al. | 119/246 |
| 5,076,210 | A * | 12/1991 | Horn | 119/203 |
| D350,840 | S | 9/1994 | Carlisle | |
| 5,363,801 | A * | 11/1994 | Watters et al. | 119/452 |
| 5,448,964 | A * | 9/1995 | Takimoto | 119/463 |
| 5,762,026 | A * | 6/1998 | Watters | 119/452 |
| 5,875,734 | A | 3/1999 | Boyle | |
| 6,176,202 | B1 * | 1/2001 | Wood | 119/246 |
| 6,349,675 | B1 * | 2/2002 | Thrun | 119/265 |
| 6,520,117 | B1 * | 2/2003 | Wood | 119/246 |
| 6,543,386 | B1 | 4/2003 | Boggs | |
| 2001/0054394 | A1 * | 12/2001 | Marchioro | 119/452 |

* cited by examiner

*Primary Examiner*—Teri Pham Luu
*Assistant Examiner*—Joshua Michener

(57) ABSTRACT

A bifurcated habitat includes a bifurcated frame having a divider traversing the frame and a plurality of compartments defined on opposed sides of the divider. One compartment is isolated from the remaining compartments for maintaining a predetermined volume of water therein. Another one of the compartments includes a cage and a lower section in fluid communication therewith. The cage further includes a pivoting door situated adjacent to one end portion thereof. The habitat further includes a cover positioned onto a top portion of the frame and includes a plurality of pivotally connected doors. Each of the cover doors is independently movable between open and closed positions and includes a light-emitting source connected to one of the cover doors.

18 Claims, 3 Drawing Sheets

BIFURCATED HABITAT FOR ANIMALS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION
TECHNICAL FIELD

This invention relates to a habitat for animals and, more particularly, to a bifurcated habitat for animals for contemporaneously housing a plurality of aquatic and terrestrial animals.

PRIOR ART

Aquariums have been known for centuries. They allow marine plants and animals to be kept and viewed in a controlled environment. Likewise, terrariums have long allowed convenient viewing of terrestrial plants and animals of exotic origin. Aquariums and terrariums can be both educational and entertaining. Most terrestrial plants and animals cannot live under water. For that reason it is visually stimulating and interesting to see terrestrial plants and animals displayed next to aquatic life forms. This usually requires multiple tanks however, one for the aquarium and one for the terrarium.

An aquarium having a bottom and four sidewalls includes a transparent divider that divides the aquarium into two physically separate compartments while maintaining the visual impression of a single compartment aquarium. The transparent divider thus provides two compartments for maintaining separate newly born fry or other small fish and larger fish that are natural predators of the small fish, without impairing the esthetic backdrop which is customary in aquariums. Yet, such a divider provides no means for housing terrestrial animals in the same container as the aquatic animals.

Accordingly, a need remains for a bifurcated habitat for animals in order to overcome the above-noted shortcomings. The present invention satisfies such a need by providing a habitat that is convenient, practical, durable, provides space savings, and is easy to use. Such a habitat may be produced in a variety of sizes and advantageously eliminates the need for two separate tanks. The habitat thus appeals to residential aquarium owners who also own other small pets.

BRIEF SUMMARY OF THE INVENTION

In view of the foregoing background, it is therefore an object of the present invention to provide a bifurcated habitat for animals. These and other objects, features, and advantages of the invention are provided by an apparatus for contemporaneously housing a plurality of aquatic and terrestrial animals.

The apparatus includes a bifurcated frame that has a centrally disposed longitudinal axis and further includes a divider traversing the frame along the axis. Such a divider preferably includes a transparent glass panel for advantageously providing a line of sight between the aquatic and terrestrial compartments. The frame further includes a plurality of compartments defined on opposed sides of the divider. One of the compartments is isolated from the remaining ones of the compartments for maintaining a predetermined volume of water therein such that the aquatic animals can be sheltered from the environment.

The frame may further include a plurality of transparent glass panels attached thereto. One such frame glass panel defines a bottom surface of the apparatus and extends along a width thereof wherein one of the support legs is attached to an underside thereof for effectively supporting the frame glass panel at a substantially stable position. The one compartment is defined by selected ones of the frame glass panels and the divider glass panel respectively.

Another one of the compartments includes a cage and a lower section in fluid communication therewith wherein the lower section is vertically aligned beneath the cage. The cage further includes a pivoting door for advantageously assisting a caregiver to selectively access the terrestrial animals housed therein. Such a pivoting door is situated adjacent to one end portion of the cage. The cage preferably includes a plurality of sidewalls formed from wire-mesh and a plurality of elongated base members secured to the wire-mesh sidewalls and secured to the frame. One of the wire-mesh sidewalls defines a bottom surface of the cage such that animal excrement can advantageously pass through to the lower section.

The frame preferably includes substantially rectangular upper and lower sections vertically aligned and centered along the axis. Such upper and lower sections maintain a fixed spatial relationship for defining a uniform height of the compartments. The frame may further include a plurality of linear support legs that have opposed end portions secured to the upper and lower sections respectively. Selected ones of the support legs are positioned along a vertical plane and extend orthogonal to the axis. Other ones of such support legs are positioned along a horizontal plane and extend parallel to the axis.

The present invention further includes a cover detachably positioned onto a top portion of the frame. Such a cover includes a plurality of pivotally connected doors, each having a fulcrum axis defined along the divider. Each of the cover doors is independently movable between open and closed positions such that the caregiver can advantageously selectively access the compartments. The cover includes a light-emitting source connected to one of the cover doors.

The cover doors may be provided with a plurality of handles attached thereto respectively and equally spaced from the fulcrum access. One such cover door is formed from wire-mesh and is removably engageable with the cage. Another one of the cover doors is formed from solid material and is removably engageable with the one compartment. Such a cover door further has a notch formed therein for conveniently channeling a pump into the one compartment after same is adapted to the closed position.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
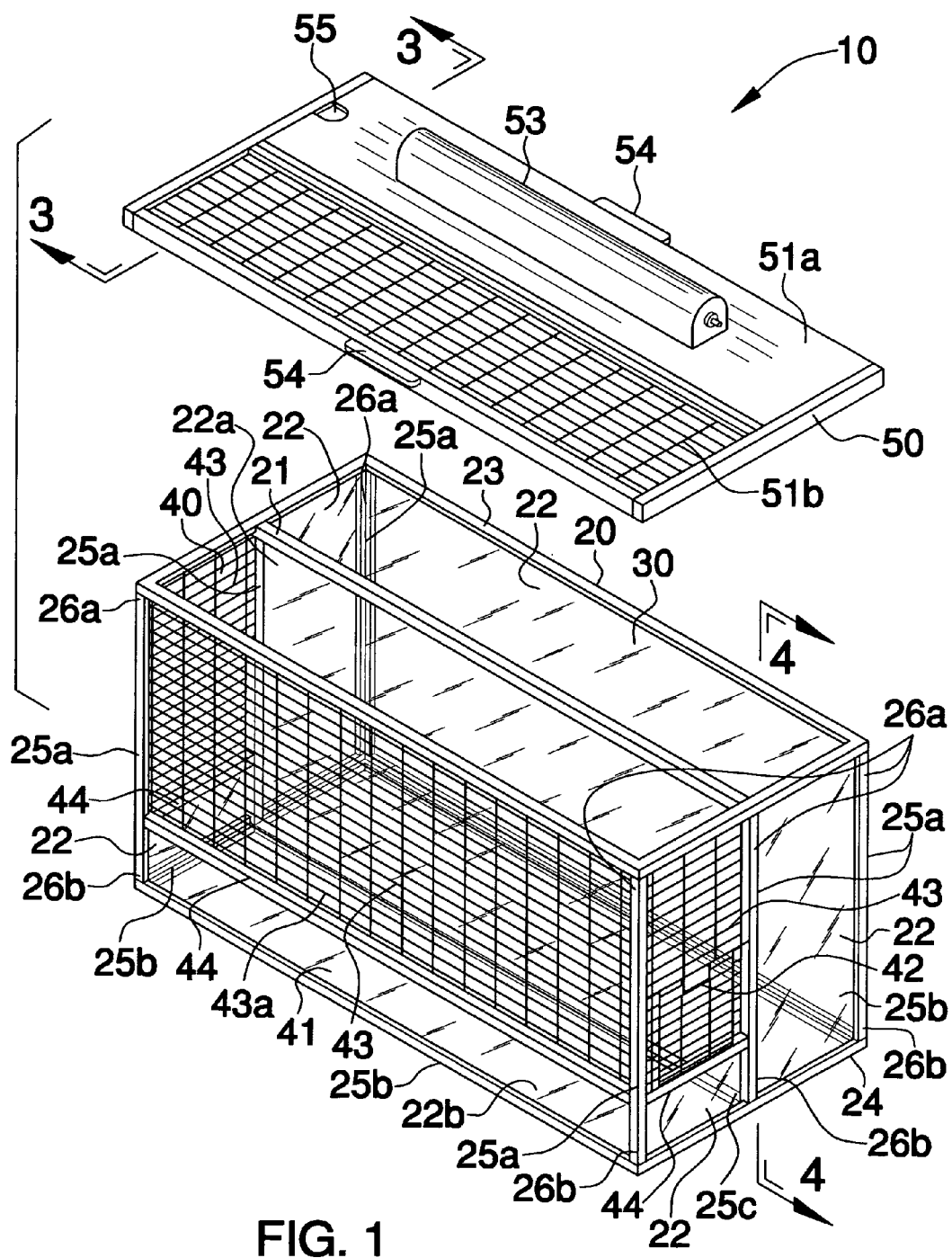
FIG. 1 is a front perspective view showing a bifurcated habitat for animals, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide a bifurcated habitat for animals. It should be understood that the apparatus 10 may be used to house many different types of animals and should not be limited to only small pets and fish.

Referring initially to FIG. 1, the apparatus 10 includes a bifurcated frame 20 that has a centrally disposed longitudinal axis and further includes a divider 21 traversing the frame 20 along the axis. Such a divider 21 includes a transparent glass panel 22A for advantageously providing a line of sight between the aquatic 30 and terrestrial 40 compartments. This feature conveniently allows a user to view both compartments from either side of the apparatus 10. The frame 20 further includes a plurality of compartments 30, 40 defined on opposed sides of the divider 21. One of the compartments 30 is isolated from the remaining ones of the compartments 40 for maintaining a predetermined volume of water therein such that aquatic animals can be sheltered from the environment.

The frame 20 further includes a plurality of transparent glass panels 22 attached thereto. One such frame glass panel 22B defines a bottom surface of the apparatus 10 and extends along a width thereof wherein one of the support legs 25C (described herein below) is attached to an underside thereof for effectively supporting the frame glass panel 22B at a substantially stable position. The one compartment 30 is defined by selected ones of the frame glass panels 22 and the divider glass panel 22A respectively.

Figure 2:
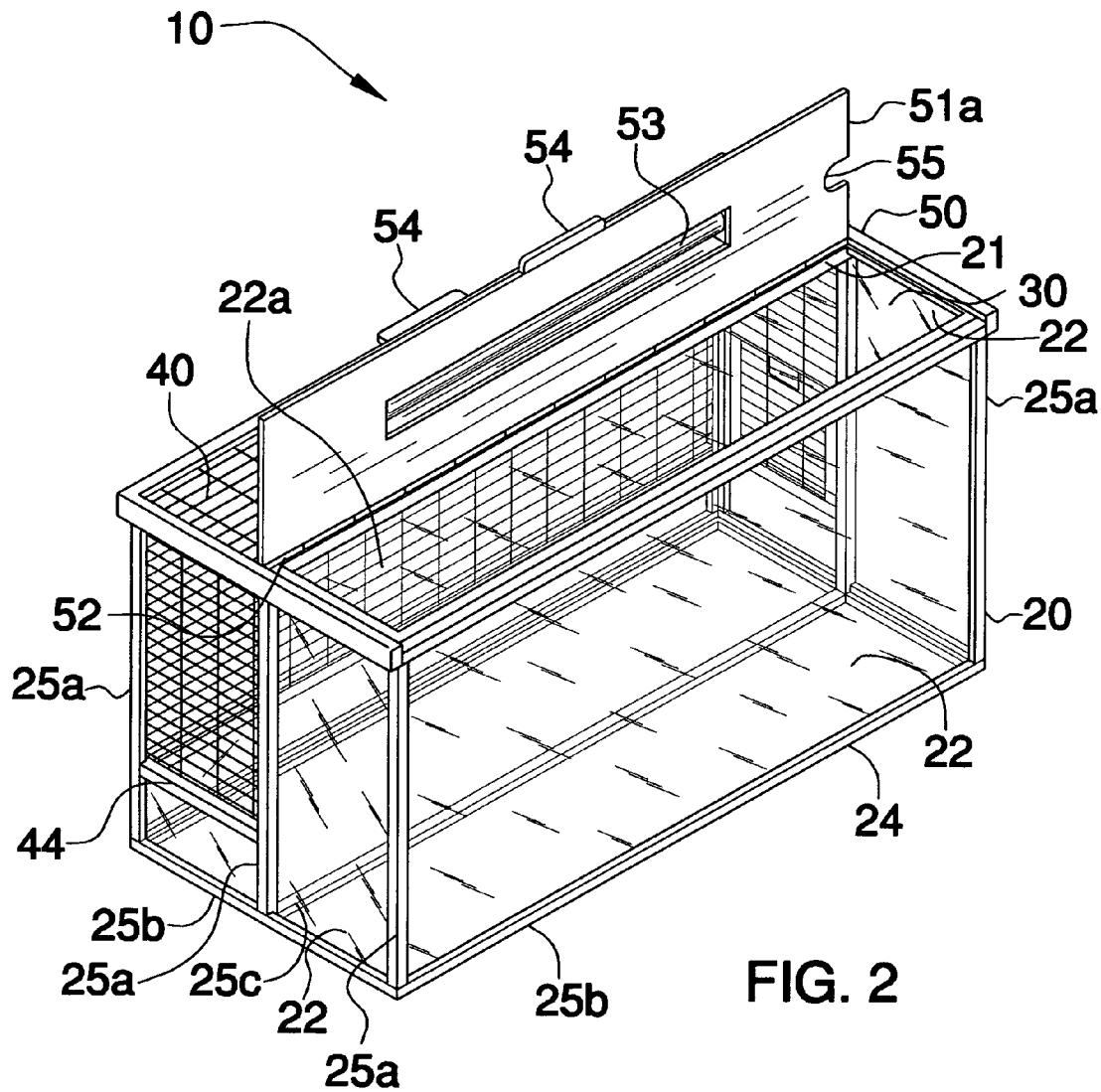
FIG. 2 is a rear perspective view of the apparatus shown in FIG. 1, showing the cover attached thereto.
Figure 4:
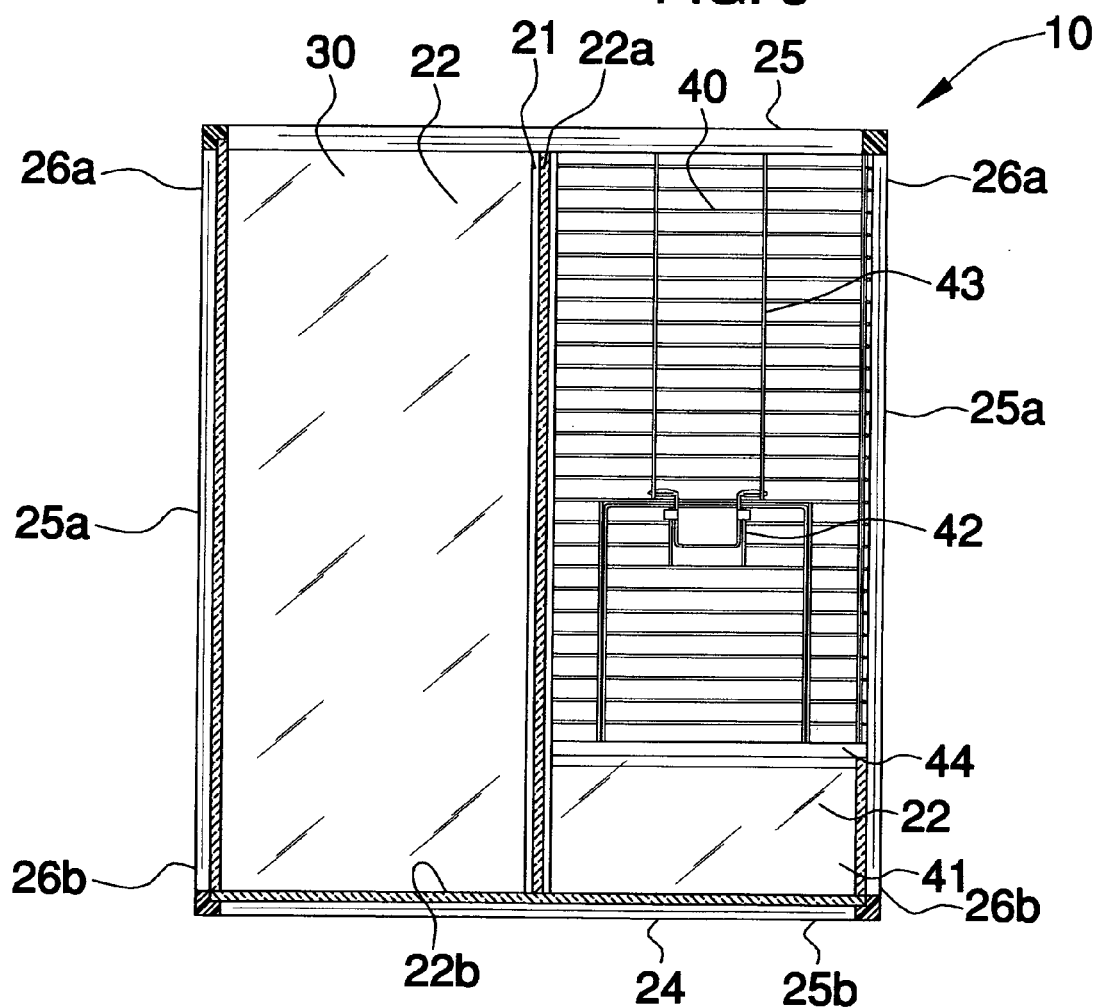
FIG. 4 is a cross-sectional view of the apparatus shown in FIGS. 1 and 2, taken along line 4—4.

Referring to FIGS. 1, 2 and 4, another one of the compartments 40 includes a cage and a lower section 41 in fluid communication therewith wherein the lower section 41 is vertically aligned beneath the cage 40. The cage 40 further includes a pivoting door 42 for advantageously assisting a caregiver to selectively access the terrestrial animals housed therein. Such a pivoting door 42 is situated adjacent to one end portion of the cage 40. The cage 40 includes a plurality of sidewalls 43 formed from wire-mesh and a plurality of elongated base members 44 secured to the wire-mesh sidewalls 43 and secured to the frame 20. One of the wire-mesh sidewalls 43A defines a bottom surface of the cage 40 such that animal excrement can advantageously pass through to the lower section 41. This feature advantageously allows such excrement to be cleaned more easily while ensuring that the living quarters of the cage also remain clean, thus saving the user time and energy.

Combining compartments 30 and 40 into one frame 20 advantageously eliminates the need for two separate compartments 30, 40, which results in considerable space savings while still allowing a user the benefit of having both terrestrial and aquatic animals as pets. Such combined compartments 30, 40 further decrease the amount of cleaning that would be required of two separate compartments.

Still referring to FIGS. 1, 2 and 4, the frame 20 includes substantially rectangular upper 23 and lower 24 sections vertically aligned and centered along the axis. Such upper 23 and lower 24 sections maintain a fixed spatial relationship for defining a uniform height of the compartments 30, 40. The frame 20 further includes a plurality of linear support legs 25A that have opposed end portions 26A, 26B secured to the upper 23 and lower 24 sections respectively. Selected ones of the support legs 25A are positioned along a vertical plane and extend orthogonal to the axis. Other ones of such support legs 25B are positioned along a horizontal plane and extend parallel to the axis.

Figure 3:
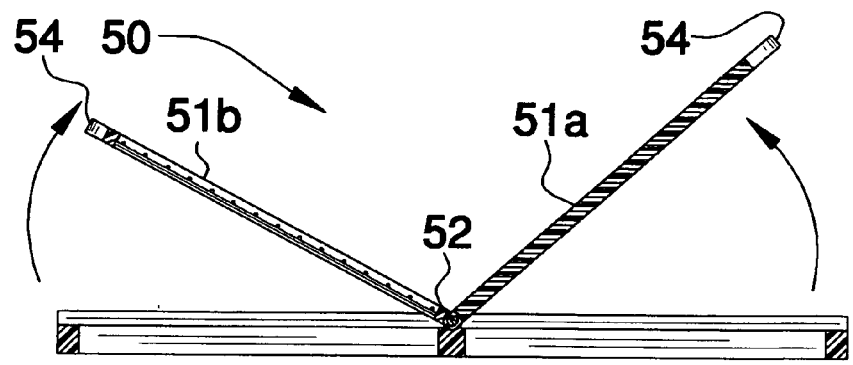
FIG. 3 is a cross-sectional view of the cover shown in FIG. 1, taken along line 3—3.

Referring to FIGS. 1 through 3, the present invention further includes a cover 50 detachably positioned onto a top portion of the frame 20. Such a cover 50 includes a plurality of pivotally connected doors 51, each having a fulcrum axis 52 defined along the divider 21. Each of the cover doors 51 is independently movable between open and closed positions such that the caregiver can advantageously selectively access the compartments 30, 40 without disturbing the animals housed in the other compartment 30, 40. The cover 50 includes a light-emitting source 53 connected to one of the cover doors 51A.

Still referring to FIGS. 1 through 3, the cover doors 51 are provided with a plurality of handles 54 attached thereto respectively and equally spaced from the fulcrum access 52. One such cover door 51B is formed from wire-mesh and is removably engageable with the cage 40. Another one of the cover doors 51A is formed from solid material and is removably engageable with the one compartment 30. Such a cover door 51A further has a notch 55 formed therein for conveniently channeling a pump (not shown) into the one compartment 30 after same is adapted to the closed position. Of course, alternate notches may be formed as well in the cover door 51A for channeling a water heater or automated feeder therethrough as may be needed.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for contemporaneously housing a plurality of aquatic and terrestrial animals, said apparatus comprising:
    a bifurcated frame having a centrally disposed longitudinal axis and including a divider traversing said frame along the axis, said frame further including a plurality of compartments defined on opposed sides of said divider, a first one of said compartments being isolated from remaining ones of said compartments for maintaining a predetermined volume of water therein such that the aquatic animals can be sheltered from the environment, a second one of said compartments including a cage and a lower section defining a third one of said compartments in fluid communication therewith wherein said third compartment is vertically aligned beneath said cage, said cage including a pivoting door for assisting a caregiver to selectively access the terrestrial animals housed therein; and
    a cover detachably positioned onto a top portion of said frame, said cover including a plurality of pivotally connected doors having a fulcrum axis defined along said divider, each said cover doors being independently movable between open and closed positions such that the caregiver can selectively access said first, second and third compartments, said cover including a light-emitting source connected thereto.

2. The apparatus of claim 1, wherein said frame comprises:
    substantially rectangular upper and lower sections vertically aligned and centered along the axis, said upper and lower sections maintaining a fixed spatial relationship for defining a uniform height of said first, second and third compartments; and
    a plurality of linear support legs having opposed end portions secured to said upper and lower sections respectively, selected ones of said support legs being positioned along a vertical plane and extending orthogonal to the axis, other ones of said support legs being positioned along a horizontal plane and extending parallel to the axis.

3. The apparatus of claim 1, wherein said divider comprises:
    a transparent glass panel for providing a line of sight between said first and second compartments.

4. The apparatus of claim 1, wherein said cage comprises:
    a plurality of sidewalls formed from wire-mesh; and
    a plurality of elongated base members secured to said wire-mesh sidewalls and secured to said frame,
    wherein one said wire-mesh sidewalls defines a bottom surface of said cage such that animal excrements can pass through to said third compartment.

5. The apparatus of claim 3, wherein said frame further comprises:
    a plurality of transparent glass panels attached thereto, one said frame glass panels defining a bottom surface of said apparatus and extending along a width thereof wherein one said support legs is attached to an underside thereof for supporting said one frame glass panel at a substantially stable position, said first compartment being defined by selected ones of said frame glass panels and said divider glass panel respectively.

6. The apparatus of claim 1, wherein said cover doors are provided with a plurality of handles attached thereto respectively and equally spaced from the fulcrum access, one said cover doors being formed from wire-mesh and being removably engageable with said cage, another said cover doors being formed from solid material and being removably engageable with said first compartment, said another cover door further having a notch formed therein for channeling a pump into said first compartment after being adapted to the closed position.

7. An apparatus for contemporaneously housing a plurality of aquatic and terrestrial animals, said apparatus comprising:
    a bifurcated frame having a centrally disposed longitudinal axis and including a divider traversing said frame along the axis, said frame further including a plurality of compartments defined on opposed sides of said divider, a first one of said compartments being isolated from remaining ones of said compartments for maintaining a predetermined volume of water therein such that the aquatic animals can be sheltered from the environment, a second one of said compartments including a cage and a lower section defining a third one of said compartments in fluid communication therewith wherein said third compartment is vertically aligned beneath said cage, said cage including a pivoting door for assisting a caregiver to selectively access the terrestrial animals housed therein; and
    a cover detachably positioned onto a top portion of said frame, said cover including a plurality of pivotally connected doors having a fulcrum axis defined along said divider, each said cover doors being independently movable between open and closed positions such that the caregiver can selectively access said first, second and third compartments, said cover including a light-emitting source connected to one said cover doors.

8. The apparatus of claim 7, wherein said frame comprises:
    substantially rectangular upper and lower sections vertically aligned and centered along the axis, said upper and lower sections maintaining a fixed spatial relationship for defining a uniform height of said first, second and third compartments; and
    a plurality of linear support legs having opposed end portions secured to said upper and lower sections respectively, selected ones of said support legs being positioned along a vertical plane and extending orthogonal to the axis, other ones of said support legs being positioned along a horizontal plane and extending parallel to the axis.

9. The apparatus of claim 7, wherein said divider comprises:
    a transparent glass panel for providing a line of sight between said first and second compartments.

10. The apparatus of claim 7, wherein said cage comprises:
    a plurality of sidewalls formed from wire-mesh; and
    a plurality of elongated base members secured to said wire-mesh sidewalls and secured to said frame,
    wherein one said wire-mesh sidewalls defines a bottom surface of said cage such that animal excrements can pass through to said third compartment.

11. The apparatus of claim 10, wherein said frame further comprises:

a plurality of transparent glass panels attached thereto, one said frame glass panels defining a bottom surface of said apparatus and extending along a width thereof wherein one said support legs is attached to an underside thereof for supporting said one frame glass panel at a substantially stable position, said first compartment being defined by selected ones of said frame glass panels and said divider glass panel respectively.

12. The apparatus of claim 7, wherein said cover doors are provided with a plurality of handles attached thereto respectively and equally spaced from the fulcrum access, one said cover doors being formed from wire-mesh and being removably engageable with said cage, another said cover doors being formed from solid material and being removably engageable with said first compartment, said another cover door further having a notch formed therein for channeling a pump into said first compartment after being adapted to the closed position.

13. An apparatus for contemporaneously housing a plurality of aquatic and terrestrial animals, said apparatus comprising:
   a bifurcated frame having a centrally disposed longitudinal axis and including a divider traversing said frame along the axis, said frame further including a plurality of compartments defined on opposed sides of said divider, a first one of said compartments being isolated from remaining ones of said compartments for maintaining a predetermined volume of water therein such that the aquatic animals can be sheltered from the environment, a second one of said compartments including a cage and a lower section defining a third one of said compartments in fluid communication therewith wherein said third compartment is vertically aligned beneath said cage, said cage including a pivoting door for assisting a caregiver to selectively access the terrestrial animals housed therein, said pivoting door being situated adjacent one end portion of said cage; and
   a cover detachably positioned onto a top portion of said frame, said cover including a plurality of pivotally connected doors having a fulcrum axis defined along said divider, each said cover doors being independently movable between open and closed positions such that the caregiver can selectively access said first, second and third compartments, said cover including a light-emitting source connected to one said cover doors.

14. The apparatus of claim 13, wherein said frame comprises:
   substantially rectangular upper and lower sections vertically aligned and centered along the axis, said upper and lower sections maintaining a fixed spatial relationship for defining a uniform height of said first, second and third compartments; and
   a plurality of linear support legs having opposed end portions secured to said upper and lower sections respectively, selected ones of said support legs being positioned along a vertical plane and extending orthogonal to the axis, other ones of said support legs being positioned along a horizontal plane and extending parallel to the axis.

15. The apparatus of claim 13, wherein said divider comprises:
   a transparent glass panel for providing a line of sight between said first and second compartments.

16. The apparatus of claim 13, wherein said cage comprises:
   a plurality of sidewalls formed from wire-mesh; and
   a plurality of elongated base members secured to said wire-mesh sidewalls and secured to said frame,
   wherein one said wire-mesh sidewalls defines a bottom surface of said cage such that animal excrements can pass through to said third compartment.

17. The apparatus of claim 16, wherein said frame further comprises:
   a plurality of transparent glass panels attached thereto, one said frame glass panels defining a bottom surface of said apparatus and extending along a width thereof wherein one said support legs is attached to an underside thereof for supporting said one frame glass panel at a substantially stable position, said first compartment being defined by selected ones of said frame glass panels and said divider glass panel respectively.

18. The apparatus of claim 13, wherein said cover doors are provided with a plurality of handles attached thereto respectively and equally spaced from the fulcrum access, one said cover doors being formed from wire-mesh and being removably engageable with said cage, another said cover doors being formed from solid material and being removably engageable with said first compartment, said another cover door further having a notch formed therein for channeling a pump into said first compartment after being adapted to the closed position.

* * * * *